United States Patent [19]
van der Lely

[11] 3,985,184

[45] Oct. 12, 1976

[54] CULTIVATORS

[76] Inventor: Cornelis van der Lely, 7, Bruschenrain, Zug, Switzerland

[22] Filed: July 7, 1972

[21] Appl. No.: 269,756

[30] Foreign Application Priority Data
July 8, 1971 Netherlands.................... 7109424

[52] U.S. Cl.................................. 172/53; 172/110
[51] Int. Cl.² ...................................... A01B 33/00
[58] Field of Search.................. 172/40, 46, 53–54, 172/84, 86–89, 93–95, 97, 101, 110; 74/70, 89, 99

[56] References Cited
UNITED STATES PATENTS

| 2,722,167 | 11/1955 | Rode.................... | 172/97 X |
| 2,764,922 | 10/1956 | Carnall et al. ........ | 172/110 X |
| 3,499,494 | 3/1970 | Gijzenberg............ | 172/53 |
| 3,520,372 | 7/1970 | Beck.................... | 172/53 X |
| 3,657,785 | 4/1972 | Vissers................. | 172/53 |

FOREIGN PATENTS OR APPLICATIONS

| 1,018,572 | 1/1953 | France............... | 172/110 |
| 487,576 | 5/1970 | Netherlands........ | 172/110 |
| 404,275 | 6/1966 | Switzerland........ | 172/53 |

Primary Examiner—Ralph T. Rader
Attorney, Agent, or Firm—Mason, Mason & Albright

[57] ABSTRACT

A cultivator for attachment to the rear of a prime mover has a frame with a plurality of side-by-side soil-working members rotatably mounted on vertical shafts journalled in said frame. A power take off connection drives a crank mechanism and connecting rods interconnect the crank mechanism with arms on the shafts to oscillate the soil-working members in operation. Each connecting rod is connected to alternate soil-working members so that neighboring soil-working members oscillate in different directions. Each soil-working member preferably has four tines in cruciform configuration and a roller is adjustably mounted to the rear of the soil-working members to regulate the latter's working depth.

20 Claims, 5 Drawing Figures

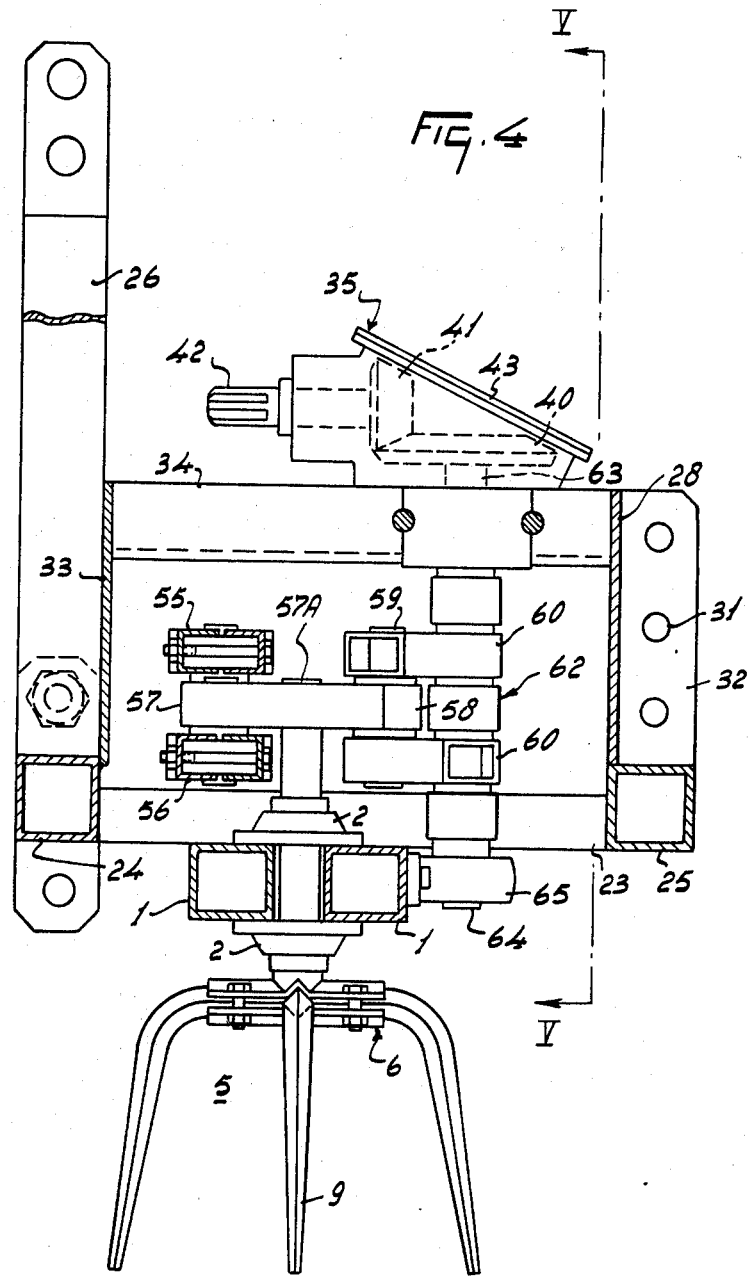

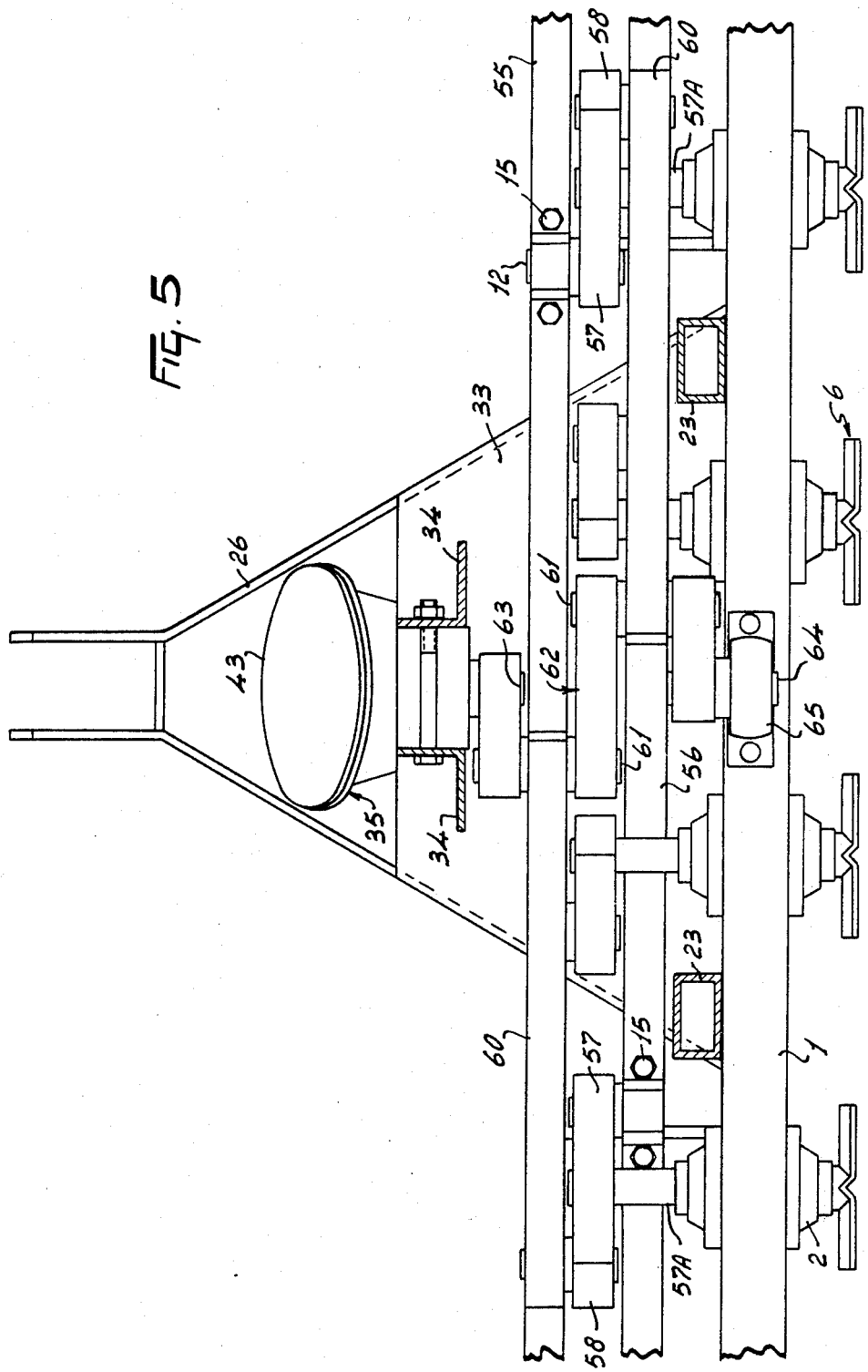

CULTIVATORS

This invention relates to soil cultivating implements or cultivators of the kind comprising a plurality of tined soil working members arranged in a row and a drive transmission arranged to turn each soil working member about a corresponding upright axis during the use of the cultivator.

According to the invention, there is provided a cultivator of the kind set forth, wherein the drive transmission is constructed and arranged in such a way that the tines of each soil working member oscillate along arcuately curved paths during the use of the cultivator, and in such a way that each soil working member is turning in the opposite direction to the or each of its neighbours in the row at any given instant of operation.

Figure 1:
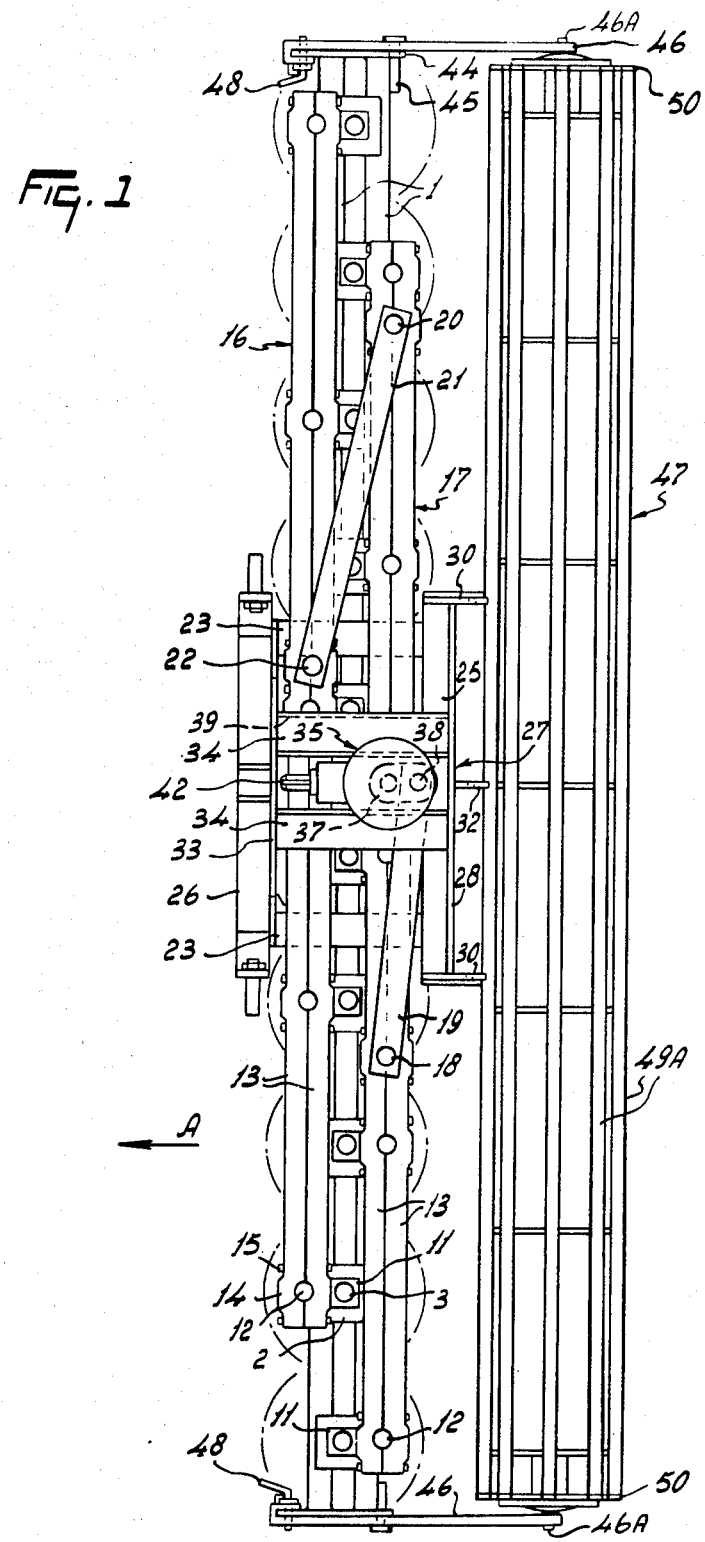
Figure 2:
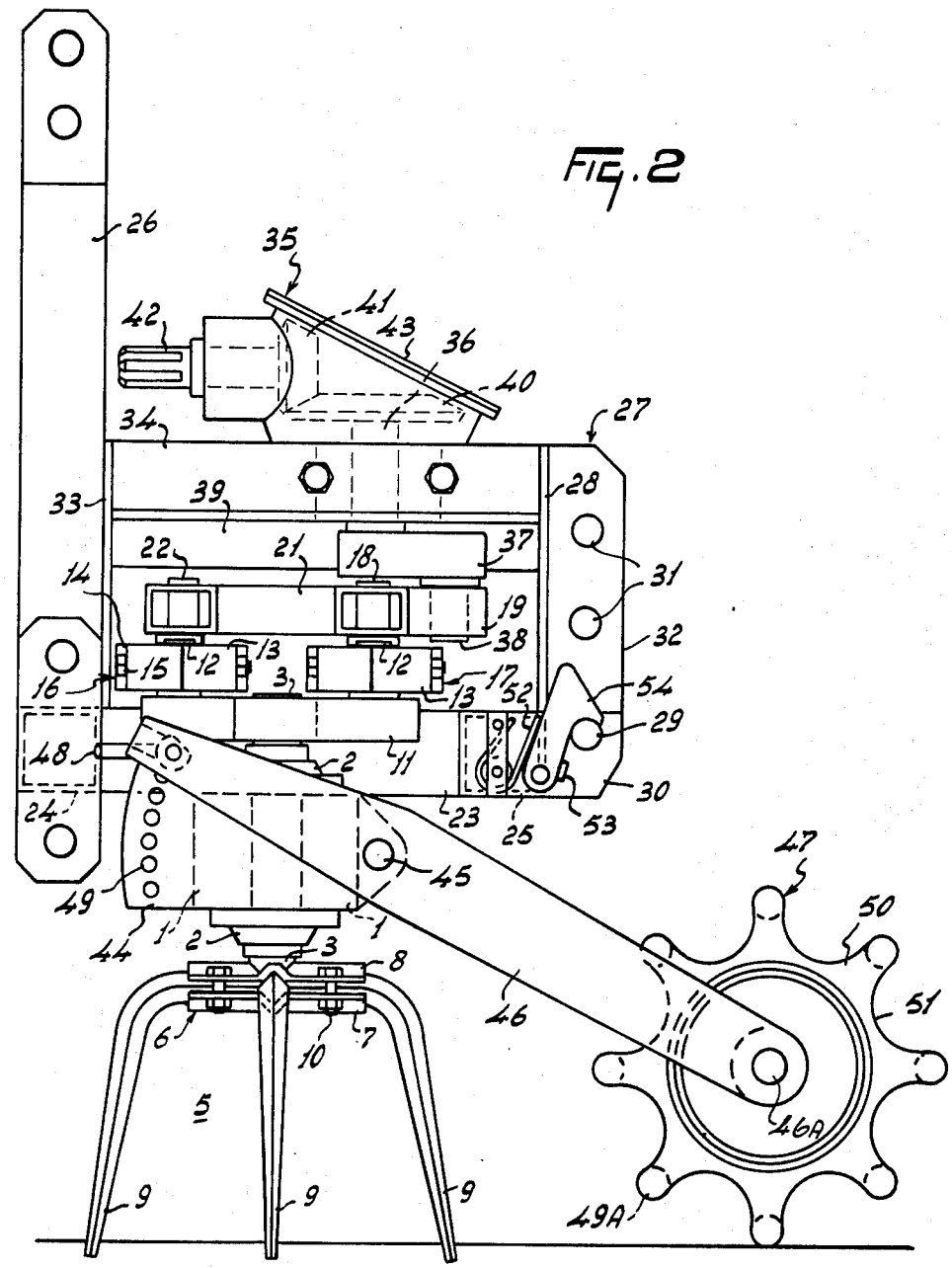
Figure 3:
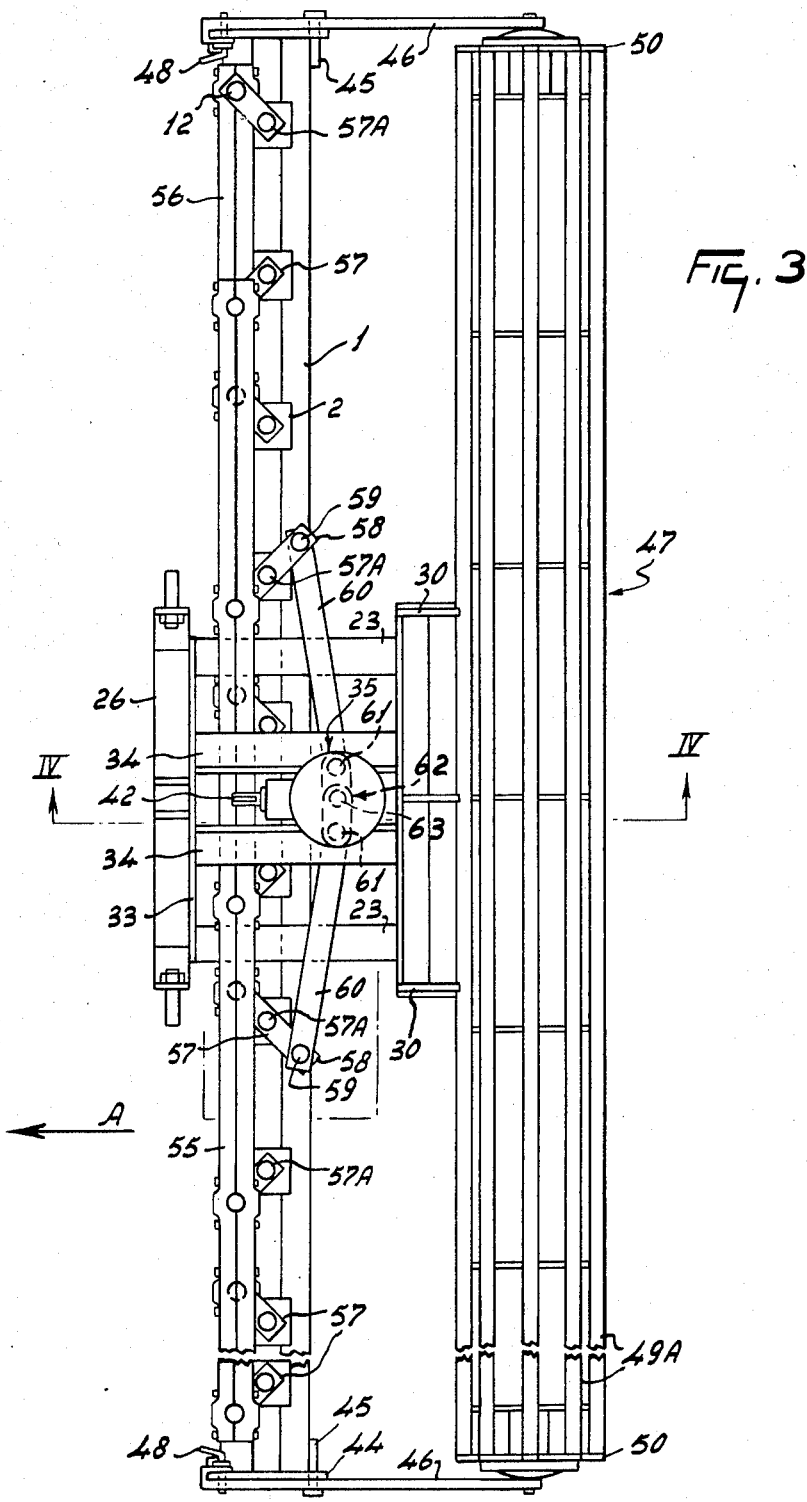

For a better understanding of the invention, and to show how the same may be carried into effect, reference will now be made, by way of example, to the accompanying drawings, in which:

FIG. 1 is a plan view of a cultivating implement or cultivator in accordance with the invention, FIG. 2 is a side elevation, to an enlarged scale, corresponding to FIG. 1, FIG. 3 corresponds to FIG. 1 but illustrates an alternative construction, FIG. 4 is a section, to an enlarged scale, taken on the line IV—IV of FIG. 3, and FIG. 5 is a sectional view of a central region of the cultivator of FIGS. 3 and 4 taken on the line V—V of FIG. 4.

Referring to FIGS. 1 and 2 of the drawings, the soil cultivating implement or cultivator which is illustrated has a frame which includes two beams 1 that are both of hollow construction and angular cross-section and that both extend substantially horizontally perpendicular to the intended direction of operative travel of the cultivator which is indicated by an arrow A in FIG. 1. The two beams 1 are parallel to one another and are spaced apart by a short distance in the direction A. Pairs of substantially vertical bearings 2 are located above and beneath the two bases 1 at regular intervals along the lengths of those beams, there being ten pairs of upper and lower bearings 2 in the example which is illustrated in FIGS. 1 and 2 of the drawings. Each pair of bearings 2 turnably supports a corresponding upright and normally substantially vertically disposed shaft 3, said shafts 3 projecting both above and below the two bearings 2 of the corresponding pairs. The intermediate portions of the shafts 3 that are disposed between the two bearings 2 of each pair are received in the space between the two parallel beams 1. Each shaft 3 affords the axis of oscillation of a corresponding soil working member 5 and each soil working member 5 comprises a generally cruciform tine support 6 having an upper embossed plate 8 that is rigidly welded or otherwise secured to the lowermost end of the corresponding shaft 3. Each support 6 also includes a matchingly shaped lower embossed plate 7 that is releasably connected to the plate 8 by four bolts 10. As can be seen in the drawings, grooves are embossed in both the lower plates 7 and the upper plates 8 in a registering cruciform pattern so that recesses of generally square, or at least angular, cross-section are defined by the two plates. These recesses receive the fastening portions of four soil working tines 9 that are formed from rigid material of corresponding square or at least angular cross-section. The fastening portion of each tine 9 is substantially horizontally disposed and merges by way of a bend having a magnitude that is somewhat greater than 90° into a downwardly directed soil working portion. Each soil working portion tapers towards the lowermost free end or tip of the corresponding tine 9 and the four soil working portions all converge in an upward direction due to the magnitude of the aforementioned bends in the tines being greater than 90°.

The ten soil working members 5 are arranged side-by-side in a single row that extends substantially horizontally perpendicular to the direction A and it is preferred that the distance between the axes of oscillation of two neighbouring shafts 3 should not be greater than 30 centimeters. The distance between the lowermost free ends or tips of the soil working portions of two opposite tines 9 is greater than the distance between the neighbouring shafts 3 so that, during the operation of the cultivator, the strips of land that are worked by the individual members 5 overlap one another to form a single broad strip of worked soil. Each shaft 3 has one end of a corresponding arm 11 secured to its uppermost end, the opposite ends of the arms 11 carrying upwardly projecting stub shafts 12 each of which is embraced by a corresponding substantially vertical bearing that is clamped between one or the other of two pairs of beams 13 of opposed channel-shaped cross-section. The two pairs of beams 13 both extend substantially parallel to the beams 1 and are formed with embossed regions 14 to hold the bearings for the stub shafts 12. The two beams 13 of each pair are clamped to one another at opposite sides of the embossed regions 14 by substantially horizontal bolts 15. The beams 13 are thus pivotally connected to the arms 11 in a simple and relatively inexpensive manner, the leading pair of beams 13 with respect to the direction A constituting a connecting rod 16 and the rearmost pair of beams 13 with respect to said direction similarly constituting a connecting rod 17. It can be seen from FIG. 1 of the drawings that the two connecting rods 16 and 17 are offset longitudinally with respect to one another in a horizontal direction perpendicular to the direction A by a distance that is substantially equal to the distance between the axes of rotation of two neighbouring shafts 3.

In the example which is being described, the foremost connecting rod 16 is linked by one of the arms 11 to the extreme right-hand soil working member 5 when the implement is viewed from the rear in the direction A while the rear connecting rod 17 is similarly linked to the extreme left-hand soil working member 5. Each of the two connecting rods 16 and 17 is linked to every second soil working member 5 along the single row thereof from the two members 5 at the opposite ends of the row so that all of the soil working members 5 of the row are alternately linked to the two connecting rods 16 and 17. The rear connecting rod 17 is provided with an additional substantially vertical bearing at some distance towards its left-hand end from the midpoint thereof when the cultivator is viewed from the rear in the direction A, this additional bearing being supported by further embossed regions similar to the embossed regions 14 of the beams 13 and accommodating a substantially vertical pivot pin 18 that projects downwardly from one end of a crank rod 19. The rear connecting rod 17 is also provided with a still further substantially vertical bearing at a location close to its right-hand end when viewed in the direction mentioned above. This bearing is again maintained in position by embossed regions of the beams 13 that are similar to the embossed regions 14. A substantially vertical stub shaft 20 carried at one end of an arm 21 is turnably received in the bearing which has just been mentioned and the opposite end of the arm 21 carries a further substantially vertical stub shaft 22 that is received in a substantially vertical bearing carried by the leading connecting rod 16 at a location close to the midpoint of the latter, said bearing again being supported by embossed regions of the beams 13 that are similar to the embossed regions 14.

Two beams 23 extend substantially parallel to the direction A are secured to the tops of the beams 1 at equal distances from the midpoints of the beams 1. The leading ends of the beams 23 are rigidly interconnected by a hollow beam 24 of square or other angular cross-section that extends parallel to the beams 1 and the rearmost ends of the beams 23 are interconnected in the same way by a hollow beam 25 that is similar to the hollow beam 24 and disposed parallel to that beam. The beam 24 carries a coupling member or trestle 26 of generally triangular configuration that is intended for connection to the three-point lifting device or hitch of an agricultural tractor or other operating vehicle. A further coupling member 27 is secured to the rear of the hollow beam 25 and comprises a triangular plate 28 extending upwardly from, and having its base secured to, the beam 25. Short vertical strips 30 are secured to the opposite ends of the beam 25 so as to project rearwardly therefrom and each strip 30 is formed with a corresponding hole 29. A strip 32 of greater vertical extent than the strips 30 is secured to the center of the beam 25 and to the plate 28 and is formed with vertically spaced apart holes 31.

A vertical plate 33 is provided at the rear of the coupling member or trestle 26 and two supports 34 extend between the front of the triangular plate 28 and the rear of the plate 33 that has just been mentioned, said supports 34 both extending substantially horizontally parallel to the direction A in relatively spaced apart relationship at equal distances from the midpoints of the two beams 1. A gear box 35 is bolted to the supports 34, the gear box having a downwardly rotary output shaft 36 whose lower end carries a crank 37 which is located at a level below that of the supports 34. The free end of the crank 37 is pivotally connected by a substantially vertical pin 38 to the end of the crank rod 19 that is remote from the pivot pin 18. The right-hand support 34 when the cultivator is viewed from the rear in the direction A carries a depending plate 39 which acts as a screen or guard for the crank 37. The upper end of the shaft 36 is provided, inside the gear box 35, with a bevel pinion 40 whose teeth are in driven mesh with those of a smaller bevel pinion 41 carried at the inner end of a rotary input shaft 42 whose leading splined or otherwise keyed end projects substantially horizontally forwardly from the gear box 35 in the direction A. The top of the gear box 35 is provided with a releasable cover 43. The front of the gear box with respect to the direction A is at a higher level than the rear thereof so that, as seen in side elevation (FIG. 2), the cover 43 of the gear box is inclined upwardly and forwardly with respect to the direction A from rear to front. This arrangement makes the interior of the gear box 35 readily accessible.

Substantially vertical plates 44 are fastened to the opposite ends of the frame beams 1 and each plate 44 has a curved leading edge. Each plate 44 is provided at its rear with a horizontal stub shaft 45 and corresponding arms 46 are turnable about the two substantially horizontally aligned stub shafts. The arms 46 extend generally in the direction A and their rearmost ends carry horizontally aligned stub shafts 46A affording the axis of rotation of a soil compression member in the form of a roller 47. The roller 47 lies to the rear of the soil working member 5 with respect to the direction A and the level of its axis of rotation with respect to the level of the remainder of the cultivator is a primary factor in determining the depth of penetration of the tines 9 into the ground surface. The leading ends of the two arms 46 are bent over so as to embrace the leading curve edges of the plates 44 and each plate is formed with a corresponding curved row of holes 49, the centers of curvature of said rows of holes being coincident with the common substantially horizontal axis afforded by the two stub shafts 45. Horizontal locking pins 48 can be entered through aligned holes formed in the arms 46 around the leading regions of the plates 44 and said locking pins 48 can be entered through those holes, and through chosen holes 49, to retain the arms 46 in corresponding angular settings about the stub shafts 45 thus fixing the level of the axis of rotation of the roller 47 relative to the level of the remainder of the cultivator. The roller 46 comprises a plurality of relatively spaced substantially vertical plates 50 each of which is formed with a plurality, such as eight, of circumferential substantially semicircular recesses 51. A similar number of circumferential projections are accordingly formed between the recesses and these projections are interconnected by elongated tubular members 49A that extend parallel to the axis of rotation of the roller that is afforded by the stub shafts 46A. In a modification which is not illustrated, the elongated tubular members 49A are wound helically around the axis of rotation of the roller 47.

In order to be able to connect other agricultural implements or tools having two or three point couplings to the coupling member 27 at the rear of the cultivator, each strip 30 is provided with a corresponding spring-loaded pawl or hook 54, each pawl or hook 54 being pivotally mounted and being urged into engagement with a corresponding stop 53 by a corresponding spring 52. The pawls or hooks 54 are so positioned as to enable coupling pins engaged in the holes 29 to be quickly and substantially automatically retained in place. When a three-point coupling is employed, an upper rod can extend above the gear box to the top of the coupling member or trestle 26 at the front of the cultivator. When implements or tools that do not have a two- or three-point coupling are to be used behind the cultivators, their draw bars or the like can be connected to an appropriate one of the holes 31 formed in the central strip 32 of the coupling member 27.

In the use of the cultivating implement or cultivator that has been described with reference to FIGS. 1 and 2 of the drawings, it is connected to the three-point lifting device or hitch of an agricultural tractor or other operating vehicle in a conventional manner using the leading coupling member or trestle 26 and the rotary input shaft 42 is placed in driven connection with the power take-off shaft of the same tractor or other operating vehicle by way of an intermediate telescopic transmission shaft (not shown) of known construction having universal joints at its opposite ends. As the cultivator is moved over the ground in the direction A, the output shaft 36 of the gear box 35 rotates and this rotation is translated into oscillation of the soil working members 5 about the axes of the corresponding shafts 3. The change from rotary to oscillatory motion is brought about by the arrangement of the crank mechanism which includes the crank 37 and the two connecting rods 16 and 17 which rods are located respectively in front of, and behind, a substantially vertical plane containing the axes of oscillation of all of the soil working members 5. Due to the provision of the arm 21 which links the two connecting rods 16 and 17 together, both connecting rods 16 and 17 will be moving in the same direction at any given instant during the operation of the cultivator and this arrangement ensures that each soil working member will be turning angularly in a direction opposite to that of its neighbour, or both its neighbours, at that time due to the fact that all of the soil working members 5 along the single row thereof are linked alternately to the connecting rod 16 and the connecting rod 17. The tines 9 of the soil working members are thus prevented from fouling one another and the soil is intensively crumbled since the tines 9 move therethrough in directions which have a component parallel to the direction A and a component that is horizontally perpendicular to the direction A. As the whole cultivator moves forwardly in the direction A, each tine 9 repeatedly oscillates through an arcuately curved path and it will be remembered that the strips of land worked by the indivdual members 5 overlap one another to produce a single broad strip of worked soil. The roller 47 which immediately follows the soil working members 5 over the ground acts to break up any hard lumps of soil left by the tines 9 and the roller can be turned upwardly or downwardly about the stub shafts 45 to increase or decrease the depth of penetration of the tines 9 into the ground surface, the locking pins 48 being entered through appropriate holes 49 to maintain the selected depth setting of the tines 9.

FIGS. 3 to 5 of the drawings illustrate a cultivating implement or cultivator which has a number of parts that are similar, or identical, to those of the cultivator which has already been described with reference to FIGS. 1 and 2 of the drawings. Accordingly, such parts are indicated in FIGS. 3 to 5 of the drawings by the same reference numerals as have been employed in FIGS. 1 and 2 thereof. In this case, there are two connecting rods 55 and 56 both of which are located in front of a substantially vertical plane containing the axes of oscillation of the single row of soil working members 5 with respect to the direction A, the connecting rod 55 being located above the connecting rod 56 and parallel to the latter. The connecting rods 55 and 56 are formed in the same manner as the previously described connecting rods 16 and 17, substantially vertical bearings being carried by the connecting rods with the aid of bolts 15 and embossed regions that are similar to the previously described embossed regions 14. Each soil working member 5 has a shaft 57A which affords its axis of oscillation and each shaft 57A carries a corresponding arm 57 at its upper end. The free ends of alternate arms 57 are pivotaly linked to either the upper connecting rod 55 or the lower connecting rod 56 but, in this case, each one of two of the arms 57, one of which is linked to the connecting rod 55 and the other to the connecting rod 56, has a rearward extension 58 and the free ends of the two extensions 58 are both connected by substantially vertical pivot pins 59 to the ends of the corresponding crank rods 60. It will be noted that the two arms 57 that have the extensions 58 are located at equal distances from the midpoints of the two main beams 1.

The opposite ends of the two crank rods 60 from their pivotal connections with the extensions 58 are pivotally connected to two relatively offset crank pins 61 of a crank that is generally indicated by the reference 62. The crank 62 includes a shaft 63 that is equivalent to the rotary output shaft 36 that has previously been described and that, like said shaft 36, extends upwardly into the gear box 35. The lower end of the crank 62 comprises a stub shaft 64, in substantially vertical alignment with the shaft 63, that is received in a vertical bearing 65 secured to the rear surface of the rearmost of the two main beams 1 with respect to the direction A. The axis of rotation of the crank 62 is afforded by the aligned shaft 63 and stub shaft 64 and the two offset crank pins 61 are 180° removed from one another about that axis.

In the use of the cultivator which has been described with reference to FIGS. 3 to 5 of the drawings, the crank 62 rotates the substantially vertical axis of the shaft 63 and stub shaft 64 by virtue of the drive transmitted to said shaft 63 from the power takeoff shaft of the operating tractor or other vehicle through the intermediary of the gear box 35. This causes the crank pins 61 and crank rods 60 to move the connecting rods 55 and 56 in relatively opposite directions but this movement again causes the soil working members 5 to turn angularly about the axes of the shafts 57A in opposite directions because both connecting rods 55 and 56 are alternately linked to said shafts 57A at points in front of a substantially vertical plane containing the axes of oscillation of all of the soil working members 5 with respect to the direction A. The operation of the cultivator is otherwise substantially identical to that which has already been described with reference to the embodiment of FIGS. 1 and 2 of the drawings. The construction described with reference to FIGS. 3 to 5 of the drawings has the advantage that both of the connecting rods are located in front of the soil working members 5 with respect to the direction A so that the center of gravity of the cultivator is closer to the operating tractor or other vehicle than with the construction of FIGS. 1 and 2 of the drawings. A more favourable weight loading of the operating tractor or other vehicle is thus obtained and this can be particularly important when at least one further agricultural implement or tool is connected to the rear of the cultivator to operate behind the roller 47.

Although certain features of the cultivating implements or cultivators which have been described and/or illustrated in the accompanying drawings will be set forth in the following claims as inventive features, it is emphasised that the invention is not necessarily limited to those features and that it encompasses within its scope all of the parts of the cultivating implements or cultivators that have been described and/or illustrated both individually and in various combinations.

What we claim is:

1. A cultivator attachment comprising a frame with coupling means for connection to the rear of a prime mover and a plurality of soil-working members mounted in a row on said frame, said row extending generally transverse to the direction of travel, and a power take off connection being supported on said frame, in driving engagement with a crank mechanism, said crank mechanism being drivingly connected to reciprocate connecting rod means, and said soil-working members each being mounted on an upwardly extending shaft and having downwardly extending tine means positioned to work overlapping strips of land, said connecting rod means comprising two offset connecting rods, the shafts of said soil-working members being rotatably supported on said frame and being connected in driving engagement with the connecting rod means through respective horizontally extending arms, adjacent shafts being in driving connection through said arms to different connecting rods of said connecting rod means for rotation in opposite directions from neighboring shafts, said tine means being oscillated back and forth in arcuate paths during operation.

2. A cultivator as claimed in claim 1, wherein each connecting rod is comprised of two beams that are clamped to one another with the interposition of bearings arranged to receive stub shafts, said stub shafts being linked to the upright shafts of said soil-working members, said beams being channel-shaped in cross-section and being formed with embossed regions to house said bearings.

3. A cultivator as claimed in claim 1, wherein said connecting rods extend substantially parallel to one another.

4. A cultivator as claimed in claim 3, wherein said connecting rods are located one behind the other with respect to the direction of operative travel of said cultivator.

5. A cultivator as claimed in claim 1, wherein said connecting rods are located at different vertical levels.

6. A cultivator as claimed in claim 1, wherein said connecting rods are located at opposite sides of a substantially vertical plane containing the axes of oscillation of all of said soil-working members.

7. A cultivator as claimed in claim 1, wherein said connecting rods are both located in front of a substantially vertical plane containing the axes of rotation of all of said soil-working members.

8. A cultivator as claimed in claim 1, wherein only one of said connecting rods is directly linked with said crank mechanism.

9. A cultivator as claimed in claim 8, wherein a pivotal coupling is located between said one connecting rod directly linked to said crank mechanism and the other connecting rod, said pivotal coupling being linked to move both connecting rods in the same direction at the same time.

10. A cultivator as claimed in claim 9, wherein the rearmost of said two connecting rods is directly linked to said crank mechanism.

11. A cultivator as claimed in claim 8, wherein said two connecting rods are interconnected to said crank mechanism to be moved in opposite directions with respect to one another at the same time.

12. A cultivator as claimed in claim 1, wherein there are ten soil-working members.

13. A cultivator attachment comprising a frame with coupling means for connection to the rear of a prime mover and a plurality of soil-working members mounted in a row on said frame, said row extending generally transverse to the direction of travel, and a power take off connection being supported on said frame in driving engagement with a crank mechanism, said crank mechanism being drivingly connected to reciprocate connecting rod means, and said soil-working members each being mounted on a rotatable upwardly extending shaft and having downwardly extending tines positioned to work overlapping strips of land, the lowermost free ends of said tines being spaced apart from one another, said connecting rod means comprising two offset connecting rods, the shafts of said soil-working members being in driving engagement with the connecting rod means through corresponding arms, said arms extending horizontally and adjacent shafts being drivenly connected to different connecting rods of said connecting rod means through said arms for rotation in opposite directions from neighboring shafts, said tine means being oscillated back and forth in arcuate paths during operation.

14. A cultivator as claimed in claim 13, wherein said shafts are secured between two frame beams of said frame.

15. A cultivator as claimed in claim 14, wherein said two frame beams have a pair of upper and lower bearings in which each of said shafts is journalled.

16. A cultivator as claimed in claim 13, wherein said shafts of said soil-working members are spaced apart from one another by distances of about 30 centimeters.

17. A cultivator as claimed in claim 13, wherein each soil-working member has at least three tines.

18. A cultivator as claimed in claim 17, wherein each soil-working member has four tines.

19. A cultivator as claimed in claim 18, wherein said tines are arranged in cruciform relationship.

20. A cultivator as claimed in claim 13, wherein said crank mechanism is located adjacent said coupling means and connectable to the power take-off shaft of the prime mover.

* * * * *